Oct. 25, 1932.  A. DINA  1,884,610
MECHANICAL MOVEMENT
Filed July 2, 1930   5 Sheets-Sheet 1

INVENTOR
Augusto Dina
BY
Austin + Dix
ATTORNEYS

Oct. 25, 1932.   A. DINA   1,884,610
MECHANICAL MOVEMENT
Filed July 2, 1930   5 Sheets-Sheet 3

INVENTOR
Augusto Dina
BY
Austin + Dix
ATTORNEYS

Oct. 25, 1932.  A. DINA  1,884,610
MECHANICAL MOVEMENT
Filed July 2, 1930  5 Sheets-Sheet 4
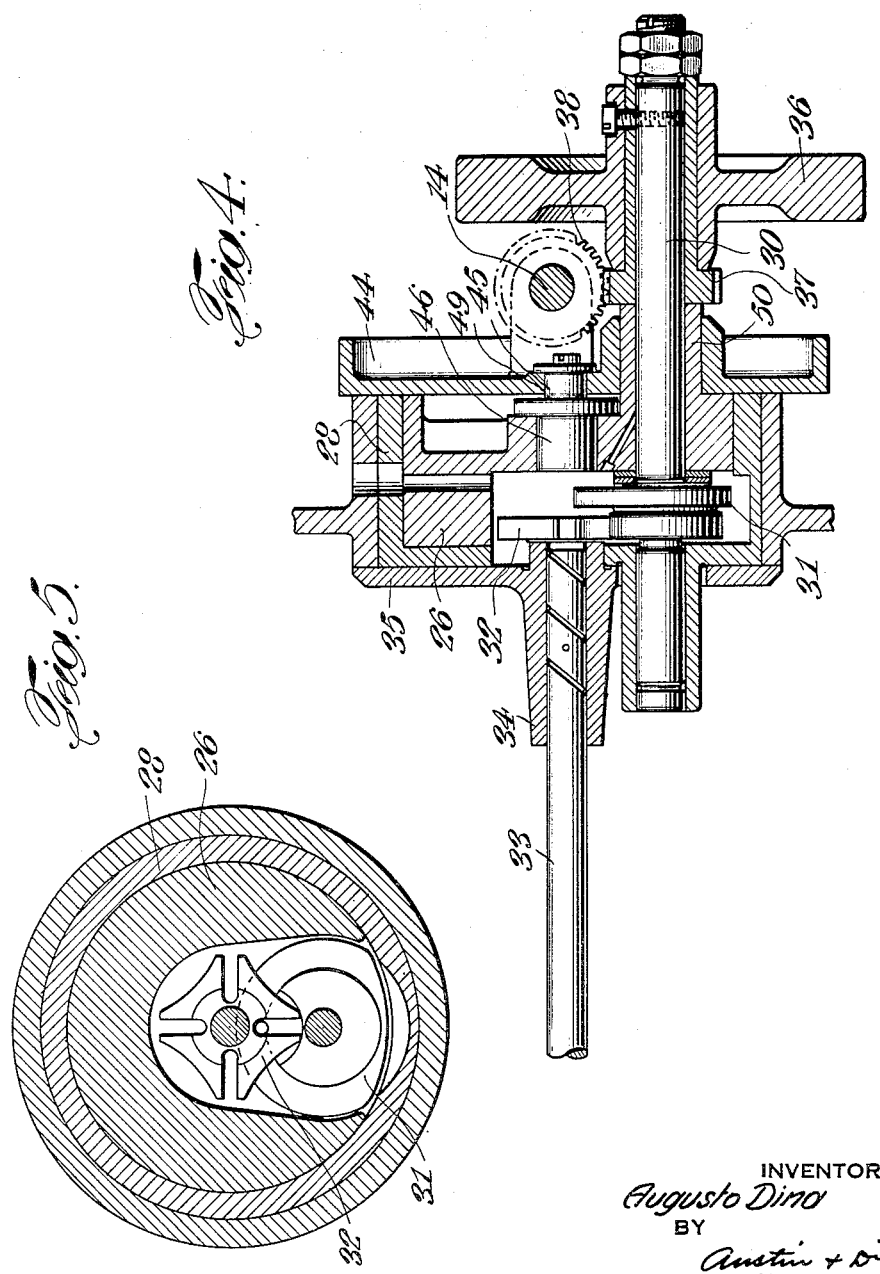
INVENTOR
Augusto Dina
BY
Austin + Dix
ATTORNEYS Oct. 25, 1932.   A. DINA   1,884,610
MECHANICAL MOVEMENT
Filed July 2, 1930   5 Sheets-Sheet 5

INVENTOR
Augusto Dina
BY
Austin & Dix
ATTORNEYS

Patented Oct. 25, 1932

1,884,610

UNITED STATES PATENT OFFICE

AUGUSTO DINA, OF ELIZABETH, NEW JERSEY, ASSIGNOR TO INTERNATIONAL PROJECTOR CORPORATION, OF NEW YORK, N. Y., A CORPORATION OF DELAWARE

MECHANICAL MOVEMENT

Application filed July 2, 1930. Serial No. 465,350.

This invention relates to mechanical movements and has particular reference to a new and useful mechanism for enabling a load shaft to be adjusted with respect to another shaft in the movement or with respect to outside factors, without disturbing the intersystem relation.

This invention is related to the inventions set forth, described, and claimed in my copending applications as follows:—

Serial No. 380,834 filed July 25, 1929 and entitled Mechanical movement for projection machines, Serial No. 389,847, filed August 31, 1929, and entitled Improved mechanical systems.

A main object of the invention is to provide an improved mechanical movement which may readily and properly be adjusted in respect to some object outside of the system without varying the relations between the more important elements of the system.

A further object of the invention is to provide a simple, efficient and compact adjusting mechanism which will permit instant and ready adjustment even while the machine is running, and which can be easily and readily operated by the operator with least effort and expenditure of time on his part and with a high degree of accuracy and with a fineness of adjustment desirable on any high grade machine.

A still further object is to provide a simple and efficient adjusting mechanism whereby the adjustment of the load shaft or one element of the mechanism with respect to a fixed outside point may be simply and easily and effectively achieved without affecting in any material manner the cyclical relations which exist at the time between the load shaft and the other elements within the system, such as another shaft. In other words, the motion of one shaft is not affected by the adjustment of the other shaft.

Further and more specific objects, features, and advantages will more clearly appear from the description given when taken in connection with the accompanying drawings which form part of the specification and which illustrate one present preferred form of the invention.

Briefly, the invention concerns the provision of a main driving shaft directly connected to one of the load shafts of the movement. This load shaft is directly geared to a pin wheel shaft of an intermittent mechanism of the machine with a governing fly wheel mounted on and driven with the pin wheel shaft. The intermittent mechanism is disposed in a rotatable box or housing or frame which can be rotated so that the pin wheel shaft moves around the center of the box in a predetermined arc of movement. On the machine is another and practically similar box or housing containing a shaft on which is a fixed gear. This latter shaft is located exactly the same distance from the center of its box as is the pin wheel shaft from the center of its box and moves in the same arc. Means are provided to connect the two boxes or housings so that as the one with the fixed gear is moved or rotated the other will be moved in the same direction and to the same extent. The fixed gear on the second housing is meshed with a control shaft by means of a straight rack of the cylindrical type and this control shaft is connected with the one load shaft so that the movement of this load shaft as to turning or angular movement thereof is controlled. The mechanism which rotates one or the other box or housing is so related and associated with the other mechanism that the pin wheel position may be changed and in so doing the position of the associated star wheel and the other load shaft which is connected to the star wheel may be changed to adjust it regarding outside fixed factors and this can be done without changing the relations between the pin wheel and the star wheel and the other load shaft as to their instantaneous position at the instant of changing and even during the adjusting change. The cotrol shaft comes into effect to permit the change thus described without changing the angular position of the other load shaft. The disposition and position of the control shaft is such that it can be turned or rotated independently to turn the one load shaft when desired to change its time relations with respect to the intermittent mechanism or with respect to the other elements in the movement.

The present preferred form of the invention is illustrated in the accompanying drawings in which, Fig. 1 is a side elevation of the mechanical movement;

Fig. 4 is a vertical cross section through the intermittent mechanism;

Fig. 5 is a vertical longitudinal section through the intermittent mechanism;

Figure 1:
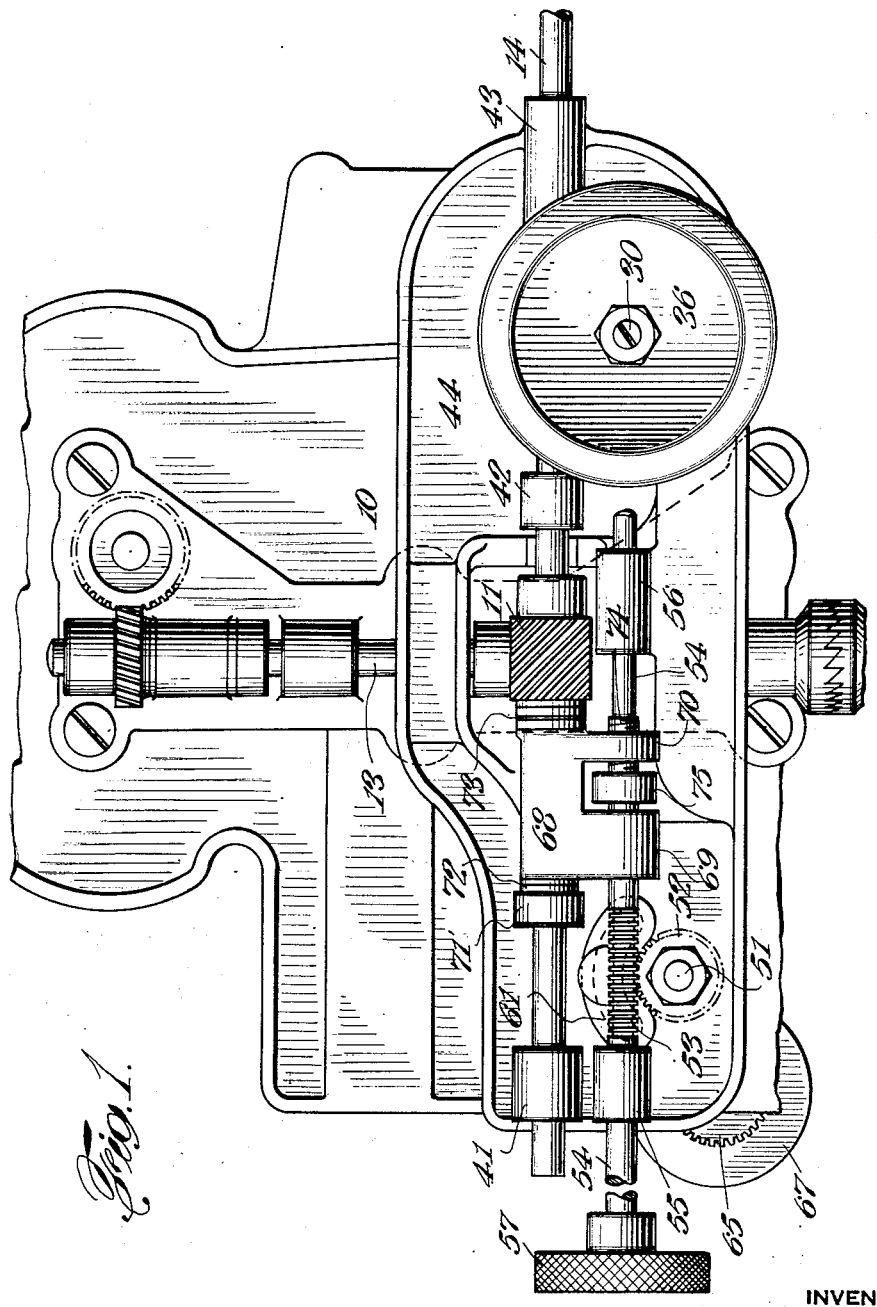

As shown in the drawings the present preferred form of the invention is applied as a mechanical movement to a motion picture projector altho it may be applied to any type of machine. It is shown as mounted on the head of the projector which has a central mechanism-supporting wall or partition 10. This apparatus comprises a main drive shaft 13 vertically disposed and suitably actuated in a manner not shown. This drive shaft 13 has thereon a gear 12 meshing with a gear 11 on a load shaft 14.

The drive of the mechanism including the load shaft 14 and the operation of the intermittent mechanism and its adjustment for the purpose of framing or adjusting the various parts are to be hereinafter described. Mounted on the partition 10 in spaced relation are two boxes 26 and 27 preferably circular and rotatable and they are disposed in suitable journals 28 and 29 formed in the wall or partition 10. These journals 28 and 29 are both open at the front and the rear and the boxes or rotatable members 26 and 27 are snugly disposed thereon. As shown in Fig. 4 the box 26 is chambered and rotatably receives a shaft 30 on one end of which is a pin wheel 31 of the usual intermittent mechanism. This pin wheel meshes with a star wheel 32 mounted on a shaft 33 disposed centrally of the axis of the box 26 and journalled in a sleeve 34 on a plate 35 fastened to a face of the journal member 28. On the other end of the shaft 33 there is fastened any suitable load or device. This shaft is a second load shaft, the first one mentioned being the shaft 14 above mentioned.

On the other end of the pin wheel shaft 30 is disposed a fly wheel 36 which regulates and smoothes the motion of the intermittent mechanism. Also a gear 37 preferably a worm gear is disposed on the shaft 30 adjacent the flywheel 36. This worm gear 37 meshes with a worm 38 on the first load shaft 14 above mentioned. The first load shaft 14 is driven directly from the drive shaft 13 as above mentioned. The first load shaft 14 is journalled at spaced points along its length in journal elements such as 41, 42, and 43 which are disposed on one face of a plate 44. This plate 44 is disposed across the face of the journals 28 and 29 and is respectively connected to the boxes 26 and 27. It is connected to the box 26, as seen in Fig. 4, by means of a headed pin shaft 45 suitably mounted on a sleeve 46 fastened to the box 26. The pin shaft 45 passes through a curved slot 49 in the plate 44, the diameter of the slot and the curvature thereof being equal to the distance between the pin wheel shaft and the center of the axis of the box 26. It will also be noticed that the plate 44 is supported on a sleeve 50 which extends from the box 26 and also acts as a journal for the pin wheel shaft 30.

Figure 2:
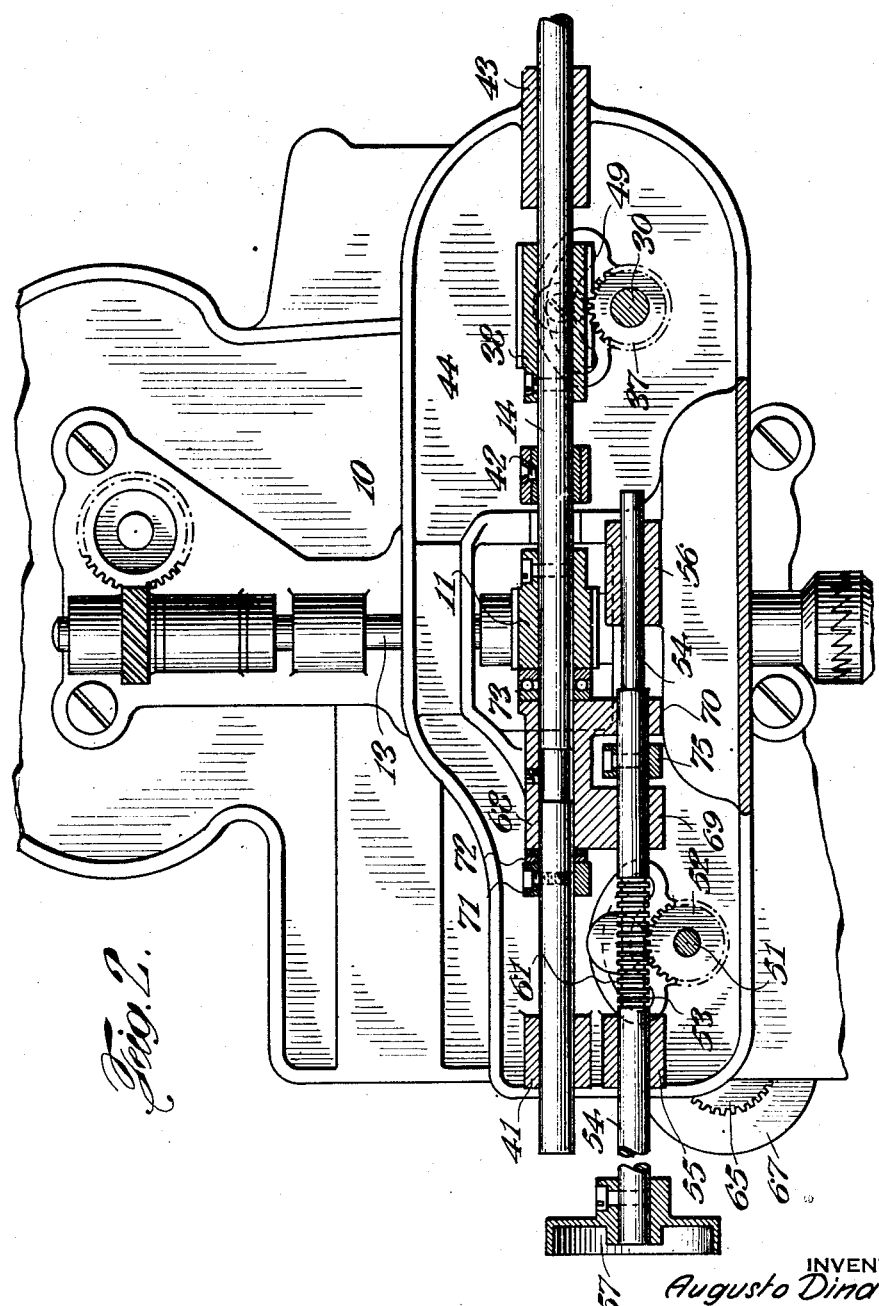
Fig. 2 is a longitudinal vertical section through the device shown in Fig. 1.
Figure 3:
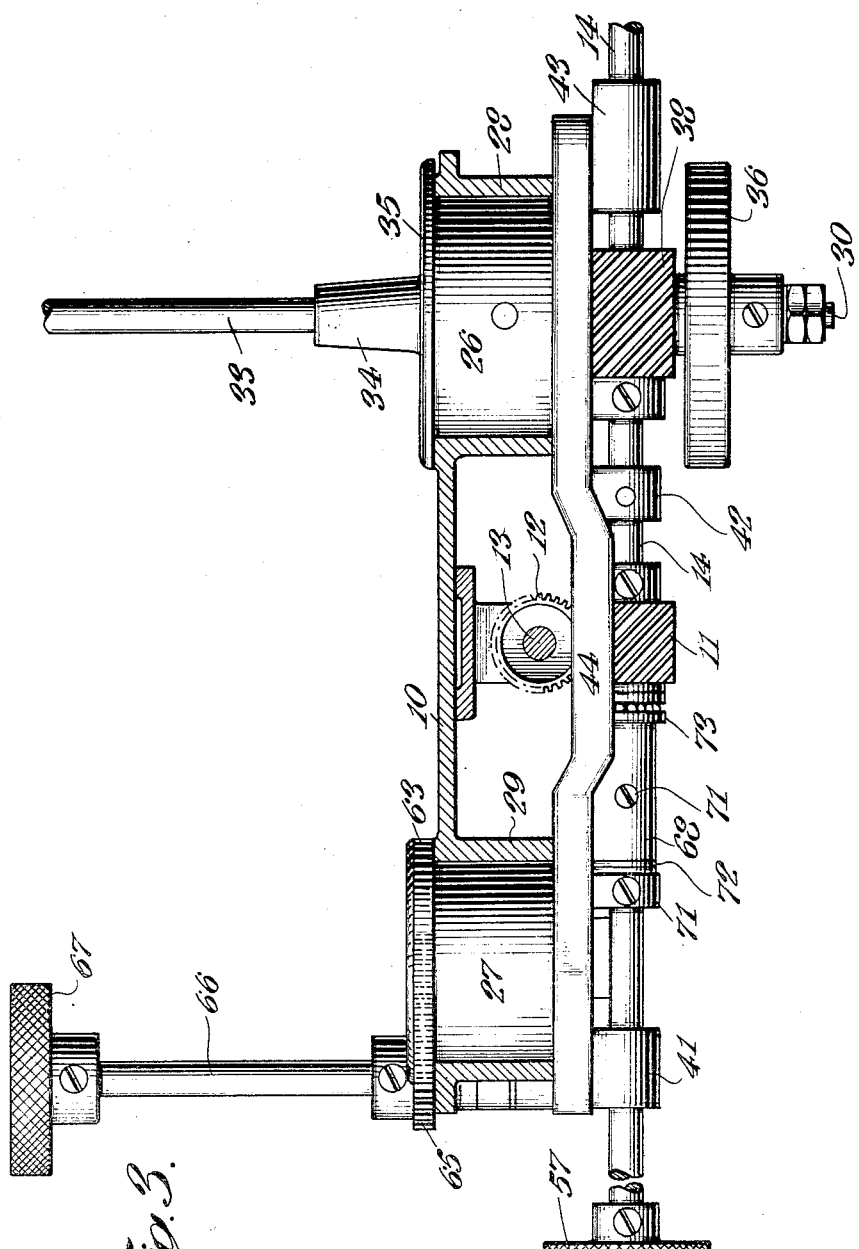
Fig. 3 is a plan view of the device partly in section.
Figure 6:
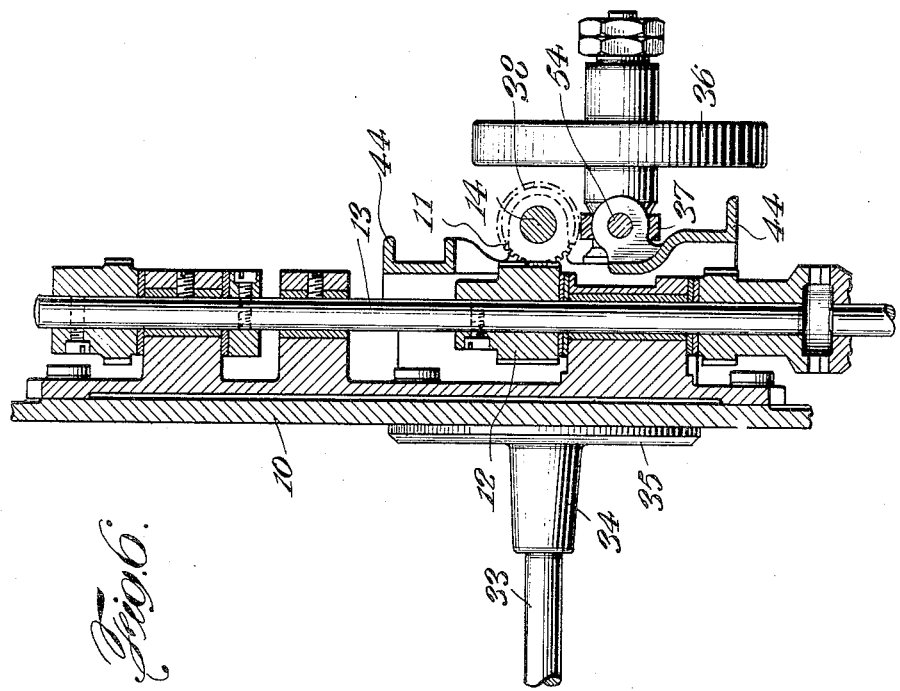
Fig. 6 is a vertical transverse section through the drive shaft showing its connection with one of the load shafts; and, Fig. 7 is a vertical transverse section through the second housing or frame showing the manner in which it is manipulated.
Figure 7:
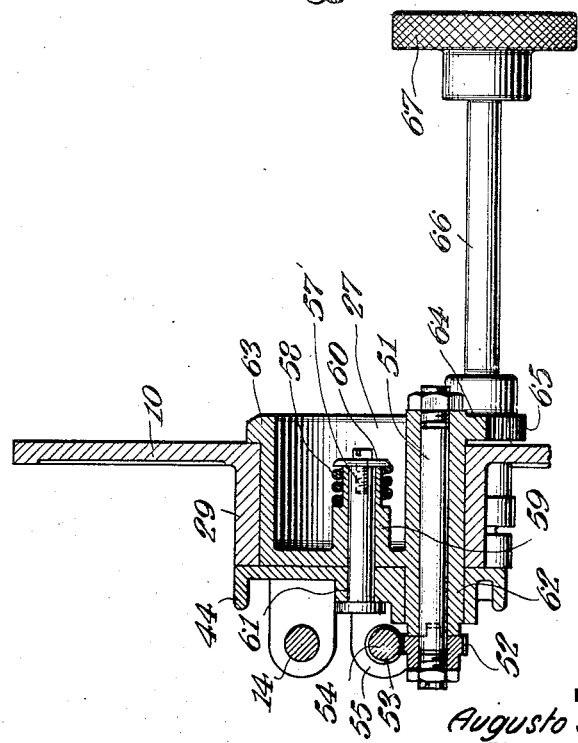

Referring now to the box 27, it will be seen especially in Fig. 7, that this box 27 is journalled in the journal element 29 on the head wall 10. This box receives a shaft 51 which is fixed therein and cannot rotate independent of the rotation of the box 27. The shaft 51 has on one end a gear 52 fixed thereon. This gear meshes with a gear 53 on a control shaft 54. This shaft 54 is journalled on the plate 44 in journals 55 and 56 as seen in Figs. 1 and 2. One end of the control shaft 54 has an operating handle 57 thereon. The gear 53 is preferably a straight rack gear as shown. It will be observed that the control shaft 54 and the first load shaft 14 are at different levels on the plate 44 altho they are both horizontal. It will also be noticed that the boxes 26 and 27 are both of the same diameter and that the arc of swing of the pin wheel shaft 30 and the arc of swing of the shaft 51 are the same altho the boxes are not at the same horizontal level on the plate 44. Therefore when the box 27 is rotated, its connection with the plate 44 will rotate the box 26 and will swing the pin wheel 30 through the same arc as that through which the shaft 51 is swung by the movement of the box 27. The plate 44 is constrained to be disposed against the face of the box 27 by means of the headed pin shaft 57' to hold the plate 44 in position and having a spring 58 between the sleeve 59 and the collar 60 on the inner end of this shaft 57. The pin shaft 57 passes through a curved slot 61 in the plate 44 which slot is similar in curvature and size to the slot 49 previously mentioned as disposed in the plate 44. Also it will be observed that a sleeve 62 extends from the box 27 through the plate 44 and acts further as a support therefor. One face of the box 27 is provided with a flange 63 the lower portion of which is provided with teeth 64 engaged by teeth on a gear 65 on a shaft 66 journalled on the partition 10 and having an end operating handle 67 to turn it. When the shaft 66 is turned then the box 27 is rotated.

Referring to Figs. 1 and 2, it will be seen that the control shaft 54 is connected to the first load shaft 14 by means of a yoke member having a main body portion 68 and two opposite spaced legs or limb portions 69 and 70. The yoke 68 is held in position on shaft 14 by means of set screws 71 which extend into a slight slot in the shaft 14 so that the yoke can be slightly adjusted along the shaft 14 if desired. The yoke member 68 is further held in position by means of collars 71' and by ring members such as 72 and 73 disposed at opposite sides thereof. One of the legs 70 is threaded and engages with threads 74 on the shaft 54 at that point so that as the shaft 54 is turned by the handle 57 the yoke member 68 may be moved longitudinally and the shaft 14 thus turned angularly as will be hereinafter explained. A collar 75 fixed to shaft 54 between the legs 69 and 70 will prevent too much movement of the yoke member 68 in either direction.

Operation

With the parts in the position shown which can be called a neutral position we will assume that it is desired to adjust the second load shaft 33 so that it has a desired relative position respecting a certain outside point. When it is desired to do this, the handle 67 is turned. This through the intermediary of the gear 65 will turn the box 27. The plate 44 being supported on the sleeve 62 of the box 27 will be moved in an arc along with the gear 52 and the shaft 51. The connection of the plate 44 with the sleeve 50 will cause the box 26 to rotate around its center and will cause the sleeve 50 and the pin wheel shaft 30 to move in an arc with the axis of the box 26 as the center. This will tend to move the shaft 33 and thereby enable it to be adjusted as desired.

As the box 27 is rotated around its center, the gear 52 which is fixed therein will turn with the box and will roll along the teeth 53 on the control shaft 54 slightly raising the control shaft as the plate 44 is slightly raised and lowered in its swinging motion. The connection of the control shaft 54 with the first load shaft 14 through the yoke 68 will prevent the first load shaft from moving any substantial amount longitudinally and will therefore cause the gear 37 to roll over the worm 38 as the pin wheel shaft 30 with the gear 37 is swung with the box 26. Since the gears 52 and 37 are of the same diameter and have the same arc of swing, the rolling movement of the gear 52 over the teeth 53 will be exactly similar to the rolling movement of the gear 37 over the worm 38. Since the gear 52 is fixed to the box 27 and does not turn independently thereof, it will be seen that the movement of the gear and the pin wheel shaft will thus be with the box 26 and not separate therefrom. Therefore the angular relations between the pin wheel shaft and the box 26 will not be changed during the adjusting action of the second load shaft 33 and therefore the internal relations between the pin wheel 31 and the star wheel 32 are not changed during this adjustment. Also the first load shaft in its position and time relation to the intermittent mechanism during the adjustment of the second load shaft is not changed. So the intersystem cyclic relations are not changed during adjustment altho the extra-system cyclic relations of the second load shaft 33 are changed with regard to a point outside the intermittent system.

When it is desired to turn the load shaft 14 to change the time position thereof with respect to the other elements of the system, then it becomes necessary to turn the control shaft 54 through the intermediary of the handle 57. This turning causes the movement of the yoke 68 by means of the threads 74. This longitudinal movement of the load shaft 14 will cause the worm 38 to ride over the worm gear 37 and this relative motion will cause the worm 38 to turn slightly and this will cause the turning of the load shaft 14, the amount of the turning of the handle 57 determining the amount to which the shutter shaft is turned as desired.

Thus the improved drive and adjusting device provides a simple and direct connection between the first load shaft and the pin wheel shaft. The pin wheel shaft carries the fly wheel and is swung around a definite arc with the load shaft. The first load shaft is prevented from turning during this swinging movement by means of the control shaft which swings in exactly the same arc and is connected to the first load shaft. The pin wheel is prevented from turning with respect to the star wheel by forcing it with the gear 37 to roll over the first load shaft worm 38 with a pure rolling action which is forced by the connection with the control shaft the motion of which is controlled by the mesh between the gear 52 and the teeth 53.

While the invention has been described in detail and with respect to the present preferred form thereof, it is not to be limited to such details and forms since many changes and modifications may be made and the invention embodied in other forms and modifications without departing from the spirit and scope of the invention in its broadest aspects. Hence it is desired to cover any and all forms of the invention which may come within the language or scope of any one or more of the appended claims.

What is claimed, is,

1. In a mechanical movement, a load shaft, a pin wheel shaft, gears on said shafts meshing with each other, a control gear, means connecting the control gear and the gear on the pin wheel shaft to cause joint movement thereof, a control shaft, a gear on said control shaft engaging said control gear, and means connecting the control shaft with the load shaft.

2. In a mechanical movement, a pair of spaced boxes, a pin wheel shaft disposed off center in one box, a gear on said pin wheel shaft, a load shaft, a gear on said load shaft meshing with the gear on the pin wheel shaft, a gear non-rotatably fixed to the second box, means connecting the boxes for joint movement, means for rotating one of said boxes, a control shaft, a gear on said control shaft engaging the fixed gear, and means connecting the control and load shafts.

3. In a mechanical movement, a pair of spaced boxes, one of said boxes housing an intermittent mechanism including an offset pin wheel shaft, an equally offset shaft non-rotatably fixed to the second box, means for rotating one of said boxes, means connecting the boxes for joint movement, a load shaft directly geared to the pin wheel shaft, a control shaft directly geared to the fixed shaft, and means connecting the load shaft and the control shaft.

4. In a mechanical movement, a pair of spaced boxes, equally offset shafts on said boxes, the shaft on one box rotatable therein a gear on said rotatable shaft, the shaft on the other box fixed therein, a gear on said fixed shaft, means for rotating the boxes together to swing the shafts, a control shaft, a gear on said control shaft engaging a gear on the fixed shaft, a load shaft, a gear on said load shaft engaging the gear on the rotating shaft, and means connecting the control and the load shafts.

5. In a mechanical movement, a pair of spaced boxes, equally offset shafts on said boxes, the shaft on one box rotatable therein, a gear on said rotatable shaft, the shaft on the other box fixed therein, a gear on said fixed shaft, means for rotating the boxes together to swing the shafts, a control shaft, a gear on said control shaft engaging the gear on the fixed shaft, a load shaft, a gear on the load shaft engaging the gear on the rotatable shaft, means connecting the control and the load shafts, and means for driving the load shaft.

6. In a mechanical movement, a pair of spaced boxes, equally offset shafts on said boxes, the shaft on one box rotatable therein, a gear on said rotatable shaft, the shaft on the other box fixed therein, a gear on said fixed shaft, means for rotating the boxes together to swing the shafts, a control shaft, a gear on said control shaft engaging the gear on the fixed shaft, a load shaft, a gear on said load shaft engaging the rotatable shaft, means connecting the control and the load shafts, and means for turning the control shaft independent of the swinging movement of the boxes.

7. In a mechanical movement, a pair of spaced boxes, equally offset shafts on said boxes, the shaft on one box rotatable thereon, a gear on said rotatable shaft, the shaft on the other box fixed thereon, a gear on said fixed shaft, means for rotating the boxes together to swing the shafts, a control shaft, a gear on said control shaft engaging the gear on the fixed shaft, a load shaft, a gear on said load shaft engaging the gear on the rotatable shaft, means connecting the control and the load shafts, means for driving the load shaft, and means for turning the control shaft independent of the swinging movement of the boxes.

8. In a mechanical movement, a rotatable intermittent box, a pin wheel shaft rotatably offset therein, a gear on the pin wheel shaft, a load shaft, a gear on said load shaft meshing with the gear on the pin wheel shaft, a second rotatable casing, a shaft non-rotatably fixed in said second box and offset equally from the center thereof, a plate connecting the boxes and movable therewith, the load shaft journalled on said plate, a control shaft journalled on said plate, a gear on said control shaft, a gear on the fixed non-rotatable shaft and meshing therewith, a yoke member connecting the load and the control shafts, and threaded means connecting the yoke and the control shaft to permit movement of the control shaft to adjust the load shaft independent of the rotation of the boxes.

9. In a mechanical movement, a rotatable intermittent box, a pin wheel shaft rotatably offset therein, a gear on the pin wheel shaft, a load shaft, a gear on said load shaft meshing with the gear on the pin wheel shaft, a second rotatable box, a shaft non-rotatably fixed on said second box, and offset equally from the center thereof, a plate connecting the boxes and movable therewith, the load shaft being journalled on said plate, a control shaft journalled on said plate, a gear on said control shaft, a gear on the fixed non-rotatable shaft and meshing therewith, a yoke member connecting the load and control shafts, threaded means connecting the yoke and the control shaft to permit movement of the control shaft to adjust the load shaft independent of the rotation of the boxes, and means for driving the load shaft.

10. In a mechanical movement, a rotatable intermittent box, a pin wheel shaft rotatably offset therein, a gear on the pin wheel shaft, a load shaft, a gear on said load shaft meshing with the gear on the pin wheel shaft, a second rotatable casing or box, a shaft non-rotatably fixed on said second box, and offset equally from the center thereof, a plate connecting the boxes and movable therewith, the load shaft journalled on said plate, a control shaft journalled on said plate, a gear on the control shaft, a gear on the fixed non-rotatable shaft and meshing therewith, a yoke member connecting the load and the controls shafts, threaded means connecting the yoke and the control shaft to permit movement of the control shaft to adjust the load shaft independent of the rotation of the boxes, and means for driving one of said boxes.

11. In a mechanical movement, a rotatable intermittent box, a pin wheel shaft rotatably offset therein, a worm gear on the pin wheel shaft, a load shaft, a worm on said load shaft meshing with the worm gear on the pin wheel shaft, a second rotatable casing or box, a shaft non-rotatably fixed on said second box, and offset equally from the center thereof, a plate connecting the boxes and movable therewith, the load shaft journalled on said plate, a control shaft journalled on said plate, a gear on said control shaft, a gear on the fixed non-rotatable shaft and meshing therewith, a yoke member connecting the load and the control shafts, threaded means connecting the yoke member and the control shaft to permit the movement of the control shaft to adjust the load shaft independent of the rotation of the boxes.

12. In a mechanical movement, a rotatable intermittent box, a pin wheel shaft rotatably offset therein, a worm gear on the pin wheel shaft, a load shaft, a worm on said load shaft meshing with the worm gear on the pin wheel shaft, a second rotatable casing or box, a shaft non-rotatably fixed on said second box, and offset equally from the center thereof, a plate connecting the boxes and movable therewith, the load shaft journalled on said plate, a control shaft journalled on said plate, a gear on said control shaft, a gear on the fixed non-rotatable shaft and meshing therewith, a yoke member connecting the load and the control shafts, threaded means connecting the yoke member and the control shaft to permit the movement of the control shaft to adjust the load shaft independent of the rotation of the boxes, and means for driving the load shaft.

13. In a mechanical movement, a rotatable intermittent box, a pin wheel shaft rotatably offset therein, a regulating flywheel on said pin wheel shaft, a gear on the pin wheel shaft, a load shaft, a gear on the load shaft meshing with the gear on the pin wheel shaft, a second rotatable casing or box, a shaft non-rotatably fixed on said second box and offset equally from the center thereof, a plate connecting the boxes and movable therewith, the load shaft journalled on said plate, a control shaft journalled on said plate, a gear on said control shaft, a gear on the fixed non-rotatable shaft and meshing therewith, a yoke member connecting the load and control shafts, and threaded means connecting the yoke member and the control shaft to permit the movement of the control shaft to adjust the load shaft independent of the rotation of the boxes.

14. In a mechanical movement, a rotatable intermittent box, a pin wheel shaft rotatably offset therein, a regulating fly wheel on said pin wheel shaft, a gear on the pin wheel shaft, a load shaft, a gear on said load shaft meshing with the gear on the pin wheel shaft, a second rotatable casing or box, a shaft non-rotatably fixed on said second box and offset equally from the center thereof, a plate connecting the boxes and movable therewith, the load shaft journalled on said plate, a control shaft journalled on said plate, a gear on the control shaft, a gear on the fixed non-rotatable shaft and meshing therewith, a yoke member connecting the load and the control shafts, threaded means connecting the yoke member and the control shaft to permit movement of the control shaft to adjust the load shaft independent of the rotation of the boxes, and means for driving the load shaft.

15. In a mechanical movement, a rotatable intermittent box, a pin wheel shaft rotatably offset therein, a gear on the pin wheel shaft, a load shaft, a gear on said load shaft meshing with the gear on said pin wheel shaft, a second rotatable casing or box, a shaft non-rotatably fixed in said second box and offset equally from the center thereof, a plate connecting the boxes and movable therewith, the load shaft journalled on said plate, a control shaft journalled on said plate, a straight cylindrical rack on said control shaft, a gear fixed to the fixed non-rotatable shaft, said gear and rack meshing with each other, a yoke member connecting the load and the control shafts, and threaded means connecting the yoke member and the control shaft to permit movement of the control shaft to adjust the load shaft independent of the rotation of the boxes.

16. In a mechanical movement, a rotatable intermittent box, a pin wheel shaft rotatably offset therein, a gear on the pin wheel shaft, a load shaft, a gear on said load shaft meshing with the gear on the pin wheel shaft, a second rotatable box, a shaft non-rotatably fixed on said second box and offset equally from the center thereof, a plate connecting the boxes and movable therewith, the load shaft journalled on said plate, a control shaft journalled on said plate, a straight cylindrical rack on said control shaft, a gear fixed to the fixed non-rotatable shaft, said gear and rack meshing with each other, a yoke member connecting the load shaft and the control shaft to permit movement of the control shaft to adjust the load shaft independent of the rotation of the boxes, and means for driving the load shaft.

17. In a mechanical movement, a rotatable intermittent box, a pin wheel shaft rotatably offset therein, a gear on the pin wheel shaft, a load shaft, a gear on said load shaft meshing with the gear on the pin wheel shaft, a second rotatable casing or box, a shaft non-rotatably fixed on said second casing and offset equally from the center thereof, a plate connecting the boxes and movable therewith, a load shaft journalled on said plate, a control shaft journalled on said plate, a gear on said control shaft, a gear on the fixed non-rotatable shaft meshing with the gear on the control shaft, said control shaft gear being in the form of a straight cylindrical rack, a yoke member connecting the load and the control shafts to permit movement of the control shaft to adjust the load shaft independent of the rotation of the boxes, means for driving the load shaft, and a regulating flywheel on the pin wheel shaft.

18. In a mechanical movement, a rotatable intermittent box, a pin wheel shaft rotatably offset therein, a gear on the pin wheel shaft, a load shaft, a gear on the load shaft, and meshing with the gear on the pin wheel shaft, a second rotatable box, a shaft non-rotatably fixed on said second box, and offset equally from the center thereof, a plate connecting the boxes and movable therewith, the load shaft journalled on said plate, a control shaft journalled on said plate, a gear on said control shaft, a gear on the fixed non-rotatable shaft meshing with the gear on the control shaft, the gear on the fixed shaft being of the same diameter as the gear on the pin wheel shaft, a yoke member connecting the load and the control shafts, threaded means connecting the yoke member and the control shaft to permit the movement of the control shaft and means for rotating one of said boxes.

19. In a mechanical movement, a rotatable intermittent box, a pin wheel shaft rotatably offset therein, a gear on the pin wheel shaft, a load shaft, a gear on said load shaft meshing with the gear on the pin wheel shaft, a second rotatable casing or box, a shaft non-rotatably fixed on said second box, and offset equally from the center thereof, a plate connecting the boxes and movable therewith, the load shaft being journaled on said plate, a control shaft journalled on said plate, a gear on said control shaft, a gear on the fixed non-rotatable shaft meshing with the gear on the control shaft, the gear on the fixed shaft being of the same diameter as the gear on the pin wheel shaft, a yoke member connecting the load and the control shafts, threaded means connecting the yoke member and the control shaft, to permit movement of the control shaft to adjust the load shaft independent of the rotation of the boxes, means for rotating one of said boxes, and means for driving the load shaft.

20. In a mechanical movement, a rotatable intermittent box, a pin wheel shaft rotatably offset therein, a gear on the pin wheel shaft, a regulating fly wheel on the pin wheel shaft, a load shaft, a gear on said load shaft meshing with the gear on the pin wheel shaft, a second rotatable casing or box, a shaft non-rotatably fixed on said second box, and offset equally from the center thereof, a plate connecting the boxes and movable therewith, the load shaft being journalled on said plate, a control shaft journalled on said plate, a gear on said control shaft, a gear on the fixed non-rotatable shaft meshing with the gear on the control shaft, the gear on the fixed shaft being of the same diameter as the gear on the pin wheel shaft, a yoke member connecting the load and control shafts, threaded means connecting the yoke member and the control shaft to permit the movement of the control shaft to adjust the load shaft independent of the rotation of the boxes, means for rotating one of said boxes, and means for driving the load shaft.

21. In a mechanical movement, a rotatable intermittent box, a pin wheel shaft rotatably offset therein, a worm gear on the pin wheel shaft, a regulating fly wheel on the pin wheel shaft, a load shaft, a worm on said load shaft meshing with the worm gear on the pin wheel shaft, a second rotatable casing or box, a shaft equally offset from the center thereof and non-rotatably fixed therein, a plate connecting the boxes and movable therewith, the load shaft being journalled on said plate, a control shaft journalled on said plate, a gear on said control shaft, a gear on the fixed non-rotatable shaft meshing with the gear on the control shaft, the gear on the fixed shaft being of the same diameter as the worm gear on the pin wheel shaft, a yoke member connecting the load and the control shafts, threaded means connecting the load and the control shafts, to permit the movement of the control shaft to adjust the load shaft independent of the rotation of the boxes, means for rotating one of said boxes, and means for driving the load shaft.

In testimony whereof I have hereunto set my hand.

AUGUSTO DINA.